March 18, 1924.
P. F. ELZI
1,487,220
EAR TAG
Filed Jan. 16, 1922
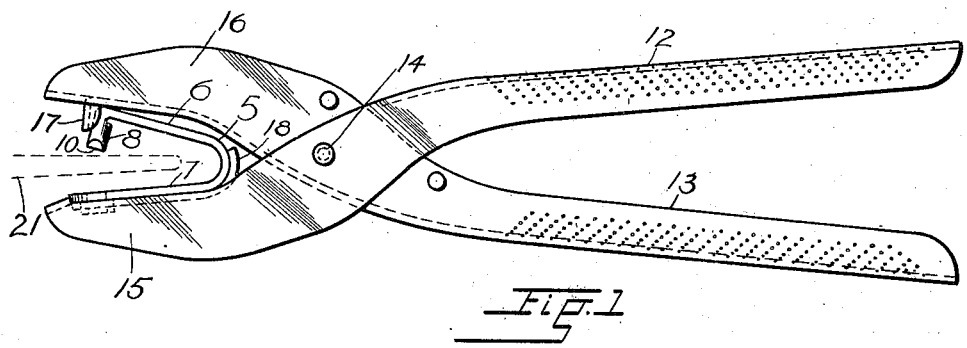
Fig. 1
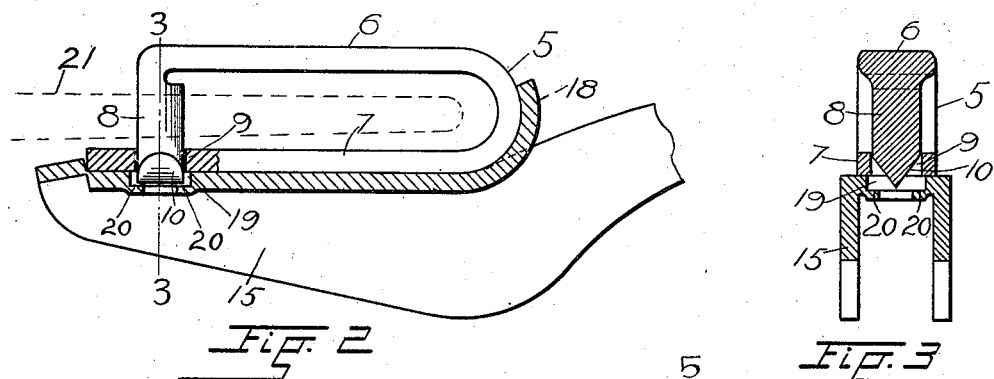
Fig. 2
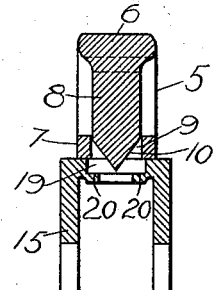
Fig. 3
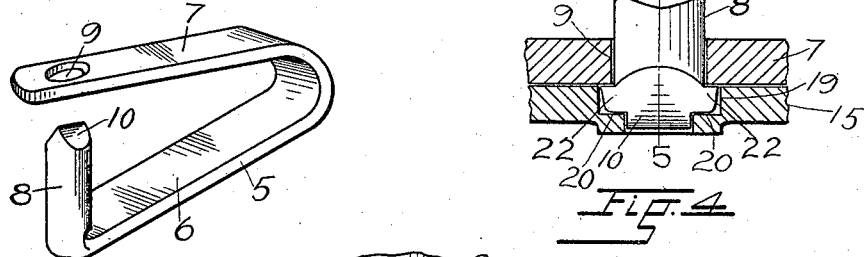
Fig. 4
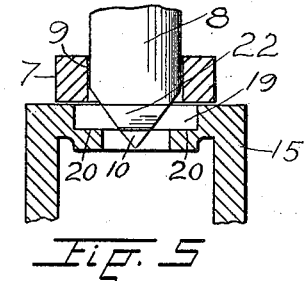
Fig. 6
Fig. 5
INVENTOR.
PETER F. ELZI
BY
ATTORNEY.

Patented Mar. 18, 1924.

1,487,220

UNITED STATES PATENT OFFICE.

PETER F. ELZI, OF DENVER, COLORADO.

EAR TAG.

Application filed January 16, 1922. Serial No. 529,519.

*To all whom it may concern:*

Be it known that I, PETER F. ELZI, a citizen of the United States, residing at Denver, in the county of Denver and State of Colorado, have invented certain new and useful Improvements in Ear Tags, of which the following is a specification.

This invention relates to marking tags for animals and more particularly to improvements in tags of the kind that are fastened to the ear of the animal by means of a pin passed through a perforation thereof.

It is an object of the present invention to provide a tag of the above described character which, after it is attached to the ear of an animal, can not be removed and restored to its original condition for re-use. A further object of the invention is to provide a marking tag in which simplicity of construction is combined with strength, durability and practicability in use, and still another object is to provide a tag of the type above referred to which can be applied to the ear of the animal without tearing or injuring the flesh.

With the above and other objects in view, my invention consists in the construction illustrated in the accompanying drawings, in the several views of which like parts are similarly designated, and in which Figure 1 is a side elevation of my improved tag in association with a tool adapted for fastening it to the ear of an animal;

Figure 2, an enlarged partially sectional elevation of the tag, showing its position relative to one of the jaws of the tool after its pin has been passed through the ear of the animal and before it is fastened;

Figure 3, a section taken on the line 3—3, Figure 2, drawn to a still further enlarged scale;

Figure 4, a further enlarged view of the end portion of the pin of the tag in conjunction with the apertured member with which it cooperates, and the jaw of the tool, the pin having been shown in the condition in which it is fastened against withdrawal, and the apertured member of the tag and the jaw being shown in section;

Figure 5, a section on the line 5—5, Figure 4; and

Figure 6, a perspective view of the tag drawn to an exaggerated scale.

Referring to the drawings, my improved tag consists of a U-shaped clip 5 of pliable, non-corrosive metal such as aluminum, the members 6 and 7 of which have at their free ends, respectively, an angularly positioned pin 8 of circular section, and an aperture 9 to which the pin is fitted. The extremity of the pin is beveled as at 10 to provide a sharp-edged ridge which is easily deformed when pressed against a shoulder of a tool especially adapted for the application of the tag. A tool of this character has been shown in the drawings to better illustrate the method by which the tags of the improved construction are fastened to the ear of the animal. The tool, which constitutes the subject matter of an application for patent, Serial Number 441,824, filed February 2, 1921, consists of two crossed members 12 and 13 which are pivotally connected as at 14. The members have jaws 15 and 16 provided with suitable means such as the shoulders 17 and 18 to hold the tag in place between them.

The jaw 15 has, furthermore, an opening 19 disposed to register with the aperture 9 of the tag and having at its outer edge an inwardly extending flange which forms an abutment shoulder 20 with which the ridge at the end of the pin of the tag engages after the pin has been passed through the aperture of the tag when the jaws of the tool are closed together. To apply the tag, it is placed between the jaws of the tool in the position shown in the drawings and hereinbefore described, after which the ear of the animal is inserted in the space between the diverging members of the tag, as indicated in broken lines at 21 in Figures 1 and 2.

When the jaws of the tool are subsequently closed together, the bevel-ended pin of the tag is forced through the ear of the animal and, owing to its circular form, punches a correspondingly shaped piece out of the ear, which by continued longitudinal movement of the pin, is passed into and through the alined openings 9 and 19 of the opposite member of the tag and the jaw of the tool with which said member engages. The continued pressure applied to the members of the tool causes the beveled edge of the pin to forcibly engage at its ends with the shoulder 20 in the opening 19 of the tool, with the result that its end-portions are sheared and bent outwardly over the edge of the aperture of the tag, through which the pin was passed, as shown at 22 in Figures 4 and 5 of the drawings.

The mutilation of the end of the pin is such that it is a practical impossibility to restore it to its original condition, and the only manner in which the tag can be removed from the ear of the animal to which it was applied is by either severing the sheared end parts of the pin completely off the body portion of the same, or by reducing or removing said parts through the medium of a file. It will thus be evident that after the tag has been removed, it is impossible to restore it to its original condition for re-use and that, therefore, the unauthorized removal and fraudulent re-use of the tags, frequently practised by dishonest persons in cattle or sheep countries or live stock markets, is effectively prevented.

I am aware that other tags of similar form are applied by passing a pin at one end thereof, through an aperture at the other end and either clinching or bending the protruding extremity of the pin over the edge of the aperture. It is a comparatively simple matter, however, to remove tags of that description and again fasten them by bending or upsetting the ends of their pins, and the distinctive feature of the present invention resides in the provision of a pin which in the application of the tag is so mutilated as to positively prevent its being used again for fastening purposes.

What I claim and desire to secure by Letters Patent is:—

1. A marking tag for animals consisting of a pliable clip having an aperture and a round pin adapted to pass through said aperture, the end of the pin being beveled to a transverse edge for the purpose specified.

2. A marking tag for animals consisting of a pliable clip having an aperture and a round pin adapted to pass through said aperture, the end of the pin being beveled in V-shape to a transverse edge for the purpose specified.

3. A marking tag for animals consisting of a pliable clip having an aperture and a pin having its end beveled to a transverse edge and extending through said aperture opposite parts at the ends of said edge being sheared off the body portion of the same and bent over the edge of the aperture to fasten the tag to a member to which it is applied.

In testimony whereof I have affixed my signature.

PETER F. ELZI.